United States Patent
Chang et al.

(10) Patent No.: US 9,013,421 B2
(45) Date of Patent: Apr. 21, 2015

(54) DRIVING METHOD FOR TOUCH-SENSING DISPLAY DEVICE AND TOUCH-SENSING DEVICE THEREOF

(75) Inventors: Hui-Hung Chang, Keelung (TW); Jyun-Sian Li, Tainan (TW); Chih-Chang Lai, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 13/326,267

(22) Filed: Dec. 14, 2011

(65) Prior Publication Data

US 2012/0249442 A1     Oct. 4, 2012

(30) Foreign Application Priority Data

Mar. 31, 2011    (TW) .............................. 100111297 A

(51) Int. Cl.
*G06F 3/041*    (2006.01)
*G06F 3/044*    (2006.01)

(52) U.S. Cl.
CPC .............. *G06F 3/0416* (2013.01); *G06F 3/044* (2013.01)

(58) Field of Classification Search
CPC . G09G 3/3266; G09G 3/3291; G09G 3/3233; G09G 2330/021
See application file for complete search history.

(56) References Cited

U.S. PATENT DOCUMENTS

| 8,482,536 | B1 * | 7/2013 | Young | 345/173 |
| 2010/0134474 | A1 * | 6/2010 | Watanabe | 345/213 |
| 2011/0015889 | A1 * | 1/2011 | Land et al. | 702/104 |
| 2011/0254884 | A1 * | 10/2011 | Cho et al. | 345/691 |
| 2012/0050181 | A1 * | 3/2012 | King et al. | 345/173 |

FOREIGN PATENT DOCUMENTS

| CN | 101482785 | 7/2009 |
| CN | 101859202 | 10/2010 |
| CN | 101995984 | 3/2011 |
| TW | M249139 | 11/2004 |
| TW | 201110001 | 3/2011 |

OTHER PUBLICATIONS

"Office Action of Taiwan Counterpart Application", issued on Feb. 21, 2014, p. 1-p. 6, in which the listed references were cited.
"Office Action of China Counterpart Application", issued on Sep. 24, 2014, p. 1-p. 6, in which the listed references were cited.

* cited by examiner

*Primary Examiner* — Michael Faragalla
(74) *Attorney, Agent, or Firm* — Jianq Chyun IP Office

(57) ABSTRACT

A driving method adapted to a touch-sensing display device is provided. The touch-sensing display device includes a display panel and a touch panel. The driving method includes following steps. A plurality of first scan signals of the touch panel are sequentially received, so that a plurality of first data values are obtained. It is determined whether the first data values are less than a difference between a baseline value and a threshold value. When one of the first data values is less than the difference between the baseline value and the threshold value, reporting of a touch coordinate of the touch panel is terminated. Furthermore, a touch-sensing device is also provided.

22 Claims, 4 Drawing Sheets

DRIVING METHOD FOR TOUCH-SENSING DISPLAY DEVICE AND TOUCH-SENSING DEVICE THEREOF

CROSS-REFERENCE TO RELATED APPLICATION

This application claims the priority benefit of Taiwan application serial no. 100111297, filed on Mar. 31, 2011. The entirety of the above-mentioned patent application is hereby incorporated by reference herein and made a part of this specification.

BACKGROUND OF THE INVENTION

1. Field of the Invention

The invention relates to a display device and a driving method. Particularly, the invention relates to a touch-sensing display device and a driving method thereof.

2. Description of Related Art

A display device having a touch-sensing function is generally implemented by a touch-sensing system and a display system independent to each other. System integration and lower cost are always unchangeable developing directions of the electronics industry. With progress of process technology, touch panels have been successfully integrated with display panels, and a user can directly control an electronic device to execute required tasks through touch-sensing. Generally, sensing units on the touch panel and pixel units on the display panel are all arranged in a matrix on a two dimensional plane, and frame update and timing for detecting a touch point are determined according to scan signals.

Generally, a difference of electrical properties of the touch panel before and after the touch-sensing operation has to be detected. Since the difference of the electrical properties is generally very tiny, prevention of noise interference is very important. However, when the display panel is driven, there are scan signals, data signals and common electrode signals, and when these signals are varied, the touch panel is interfered. With a development trend of integrating the touch panel and the display panel, interference therebetween becomes more severe. Some manufacturers manage to synchronize the signals of the display panel and the touch panel to avoid the interference. A method to avoid the signal interference is, for example, to add a synchronization signal between the display panel and the touch panel, so that a sensing time of the touch panel and a scan time of the display panel are not totally overlapped, or the synchronization signal is connected to a micro control unit (MCU) of the system, and the MCU controls a timing of the sensing operation of the touch panel, and reports corresponding touch coordinates. In other words, the above method uses the synchronization signal to notify an operation timing of the controller of the touch panel.

SUMMARY OF THE INVENTION

The invention is directed to a driving method for a touch-sensing display device and a touch-sensing device thereof, which can avoid noise interference from a display device.

The invention provides a driving method adapted to a touch-sensing display device. The touch-sensing display device includes a display device and a touch panel. The driving method includes following steps. A plurality of first scan signals of the touch panel are sequentially received to obtain a plurality of first data values. It is determined whether the first data values are less than a difference between a baseline value and a threshold value. When one of the first data values is less than the difference between the baseline value and the threshold value, reporting of touch coordinates of the touch panel is stopped.

In an embodiment of the invention, the driving method further includes determining the baseline value according to a plurality of second data values.

In an embodiment of the invention, the driving method further includes executing a scan step to sequentially receive a plurality of second scan signals of the touch panel to obtain the second data values.

In an embodiment of the invention, the driving method further includes determining whether an executing times of the scan step is greater than a predetermined sampling times of the baseline value. When the executing times of the scan step is smaller than or equal to the predetermined sampling times, the scan step is continually executed.

In an embodiment of the invention, when the executing times of the scan step is greater than the predetermined sampling times, the first scan signals of the touch panel are sequentially received to obtain the first data values.

In an embodiment of the invention, the driving method further includes setting a flag to a first state when one of the first data values is less than the difference between the baseline value and the threshold value.

In an embodiment of the invention, the driving method further includes determining whether the flag is in the first state when one of the first data values is greater than or equal to the difference between the baseline value and the threshold value.

In an embodiment of the invention, when the flag is not in the first state, the touch coordinates of the touch panel are reported.

In an embodiment of the invention, when the flag is in the first state, the flag is set to a second state, and the first scan signals of the touch panel are sequentially received to obtain the first data values after a predetermined time section is delayed.

In an embodiment of the invention, the first data values are respectively a capacitance sensing value.

In an embodiment of the invention, the display device is an electronic book device.

The invention provides a touch-sensing device, adapted to a touch-sensing display device. The touch-sensing device includes a touch panel and a touch controller. The touch panel includes a plurality of first scan lines to output a plurality of first scan signals. The touch controller receives the first scan signals to obtain a plurality of first data values, and determines whether the first data values are less than a difference between a baseline value and a threshold value. When one of the first data values is less than the difference between the baseline value and the threshold value, reporting of touch coordinates of the touch panel is stopped.

In an embodiment of the invention, the touch controller determines the baseline value according to a plurality of second data values.

In an embodiment of the invention, the touch controller executes a scan step to sequentially receive a plurality of second scan signals of the touch panel to obtain the second data values.

In an embodiment of the invention, the touch controller determines whether an executing times of the scan step is greater than a predetermined sampling times of the baseline value. When the executing times of the scan step is smaller than or equal to the predetermined sampling times, the touch controller continually executes the scan step.

In an embodiment of the invention, when the executing times of the scan step is greater than the predetermined sampling times, the touch controller sequentially receives the first scan signals of the touch panel to obtain the first data values.

In an embodiment of the invention, when one of the first data values is less than the difference between the baseline value and the threshold value, the touch controller sets a flag to a first state.

In an embodiment of the invention, when one of the first data values is greater than or equal to the difference between the baseline value and the threshold value, the touch controller determines whether the flag is in the first state.

In an embodiment of the invention, when the flag is not in the first state, the touch controller reports the touch coordinates of the touch panel.

In an embodiment of the invention, when the flag is in the first state, the touch controller sets the flag to a second state, and sequentially receives the first scan signals of the touch panel to obtain the first data values after a predetermined time section is delayed.

In an embodiment of the invention, the touch-sensing display device is a touch electronic book device.

According to the above descriptions, the noise is detected by comparing the data values and the difference between the baseline value and the threshold value, and the touch controller accordingly stops reporting the touch coordinates of the touch panel, so as to avoid the noise of the display device from interfering the touch-sensing device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following embodiments, a capacitive touch panel and a touch-sensing electronic book device are taken as an example for description, and those skilled in the art should understand that the capacitive touch panel and the touch-sensing electronic book device are not used to limit the invention.

Figure 1:
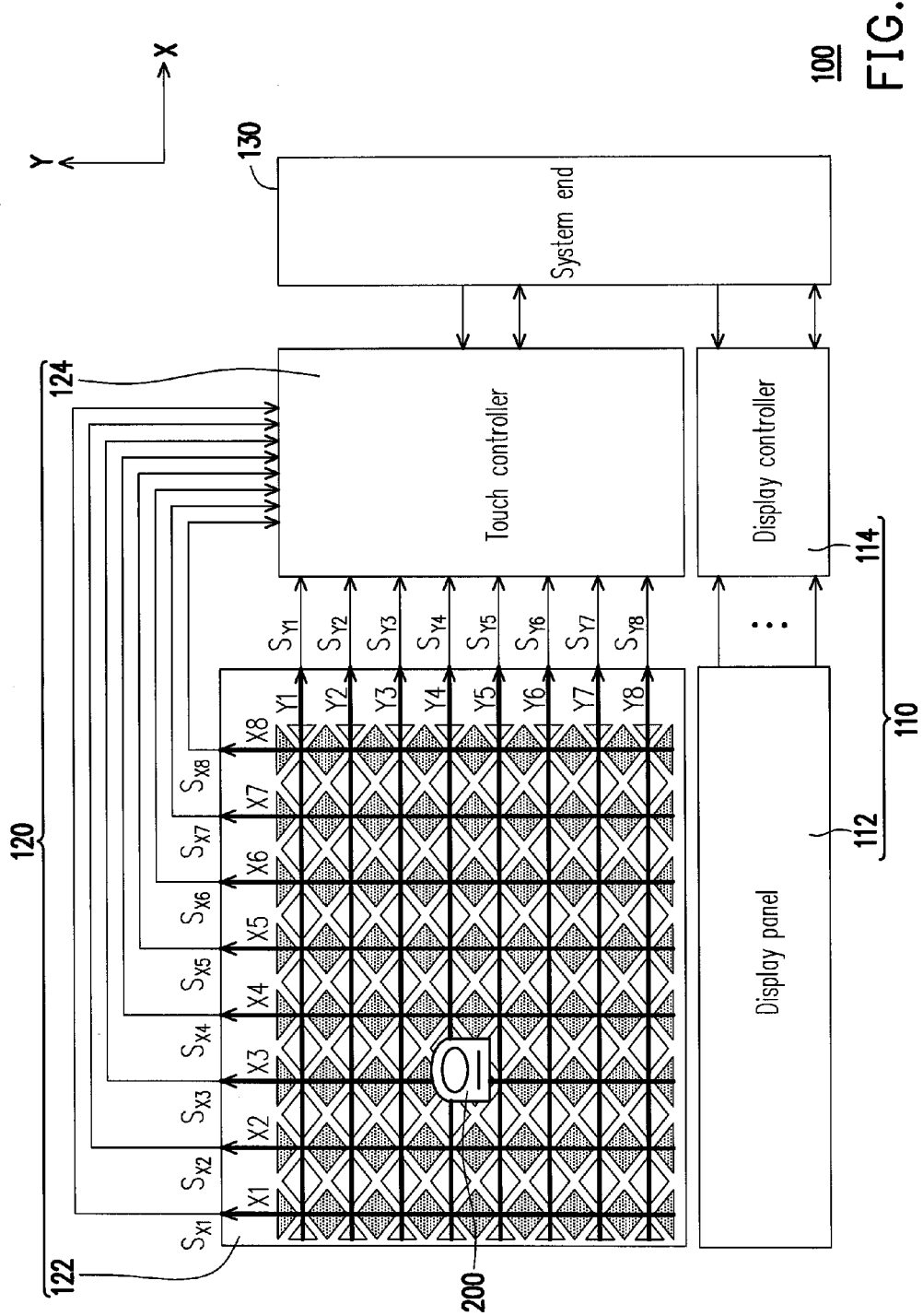
FIG. 1 is a schematic diagram of a touch-sensing display device according to an embodiment of the invention.

FIG. 1 is a schematic diagram of a touch-sensing display device according to an embodiment of the invention. Referring to FIG. 1, in the present embodiment, the touch-sensing display device 100 includes a display device 110 and a driving device 120. The driving device 120 include a touch panel 122 and a touch controller 124, where the touch panel 122 is, for example, a capacitive touch panel, and the touch-sensing display device 100 is, for example, a touch-sensing electronic book device.

In the present embodiment, the display device 110 includes a display panel 112 and a display controller 114, where the display device 110 is, for example, an electronic book device.

Moreover, the touch controller 124 and the display controller 114 are respectively coupled to a system end 130, where the touch controller 124 and the display controller 114 are coupled to the system end 130 through an I²C communication interface, and the touch controller 124 is adapted to report touch coordinates to the system end 130. On the other hand, the touch panel 122 and the display panel 112 are integrated to the same touch-sensing display device 100, and the touch panel 122 can be disposed on the display panel 122.

As shown in FIG. 1, the touch panel 122 includes a plurality of scan lines X1-X8 and Y1-Y8 to output a plurality of scan signals $S_{X1}$-$S_{X8}$ and $S_{Y1}$-$S_{Y8}$. The scan lines X1-X8 and Y1-Y8 are coupled to the touch controller 124, and are, for example, respectively arranged along a X-direction and a Y-direction. The touch controller 124 determines touch coordinates on the touch panel 122 according to the scan signals $S_{X1}$-$S_{X8}$ and $S_{Y1}$-$S_{Y8}$. For example, when a finger 200 touches the scan line X3 and the scan line Y4, the touch controller 124 senses variations of the scan signal $S_{X3}$ and the scan signal $S_{Y4}$, which are different to the scan signals $S_{X1}$-$S_{X2}$, $S_{X4}$-$S_{X8}$, $S_{Y1}$-$S_{Y3}$, $S_{Y5}$-$S_{Y8}$ respectively corresponding to the untouched scan lines X1-X2, X4-X8, Y1-Y3 and Y5-Y8, so as to determine the touch coordinates (X3, Y4) of the finger 200, and report the touch coordinates (X3, Y4) to the system end 130. In the present embodiment, the scan signals $S_{X1}$-$S_{X8}$ and $S_{Y1}$-$S_{Y8}$, for example, correspond to capacitance sensing values or voltage sensing values. In other words, the touch controller 124 sequentially receives the scan signals $S_{X1}$-$S_{X8}$ and $S_{Y1}$-$S_{Y8}$ to obtain a plurality of data values to determine the touch coordinates, where the data values are, for example, the capacitance sensing values or the voltage sensing values. Namely, when the finger 200 touches the scan line X3 and the scan lien Y4, the touch controller 124 may sense capacitance variations or voltage variations of the scan line X3 and the scan line Y4, so as to determine the touch coordinates (X3, Y4) of the finger 200.

It should be noticed that different to a general liquid crystal display (LCD), in some display devices (for example, the electronic book device), the display panel has a voltage variation only when the display device scrolls pages. In other words, the capacitive touch panel integrated with the above display device is influenced by relatively great noise only when the display device scrolls pages. Therefore, when the display device 110 of the present embodiment is the electronic book device, and when the electronic book device 110 scrolls pages, the touch controller 124 may have a wrong operation due to the noise influence on the touch panel 122, where the wrong operation is, for example, an error report of the touch coordinates.

Therefore, the present embodiment applies a driving method to automatically detect the noise. In brief, the touch controller 124 stops reporting the touch coordinates during a noise generation period (i.e. when the electronic book device 110 enters a page scrolling mode) until the electronic book device 110 completes scrolling the page, and then the touch controller 124 continually report the touch coordinates. Therefore, compared to the conventional technique, the touch-sensing display device 100 of the present embodiment may have an anti-noise effect without using a synchronization signal. The above driving method is described in detail below.

Figure 2:
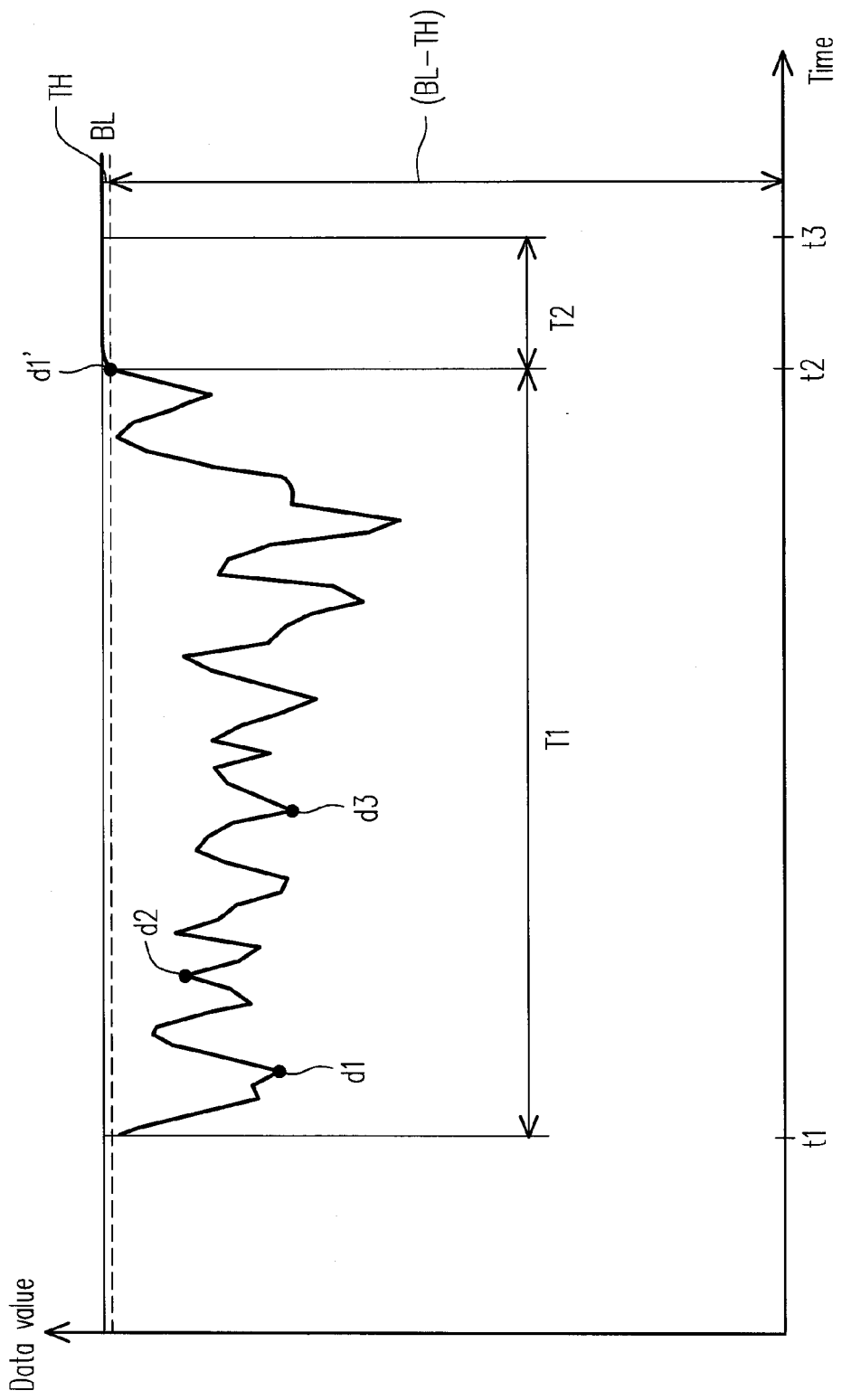
FIG. 2 is a timing diagram of data values corresponding to scan signals of FIG. 1.

FIG. 2 is a timing diagram of the data values corresponding to the scan signals $S_{X1}$-$S_{X8}$ and $S_{Y1}$-$S_{Y8}$ of FIG. 1, where the data values are, for example, instant capacitance values or instant voltage values of the scan lines X1-X8 and Y1-Y8. As shown in FIG. 2, when the electronic book device 110 is in the page scrolling mode during a time section T1, the display panel 112 generates relatively great noise, and the data values (for example, data values d1-d3) obtained by the touch controller 124 through the scan lines X1-X8 and Y1-Y8 have relatively dramatic variation. For example, the data values d1-d3 are reduced to be less than a difference (BL-TH) between a baseline value BL and a threshold value TH due to the noise influence. The baseline value BL is, for example, a baseline capacitance value, which is, for example, an environment capacitance of about 100 pF during booting. During a normal operation, data values of the scan signals $S_{X1}$-$S_{X8}$ and $S_{Y1}$-$S_{Y8}$ are close to the baseline value BL, and when the finger 200 touches the touch panel 122, the data values are higher than the baseline value BL for a certain degree (for example, 105 pF), so that the touch controller 124 can determine a touch position by comparing the data values and the baseline value BL.

Figure 3A:
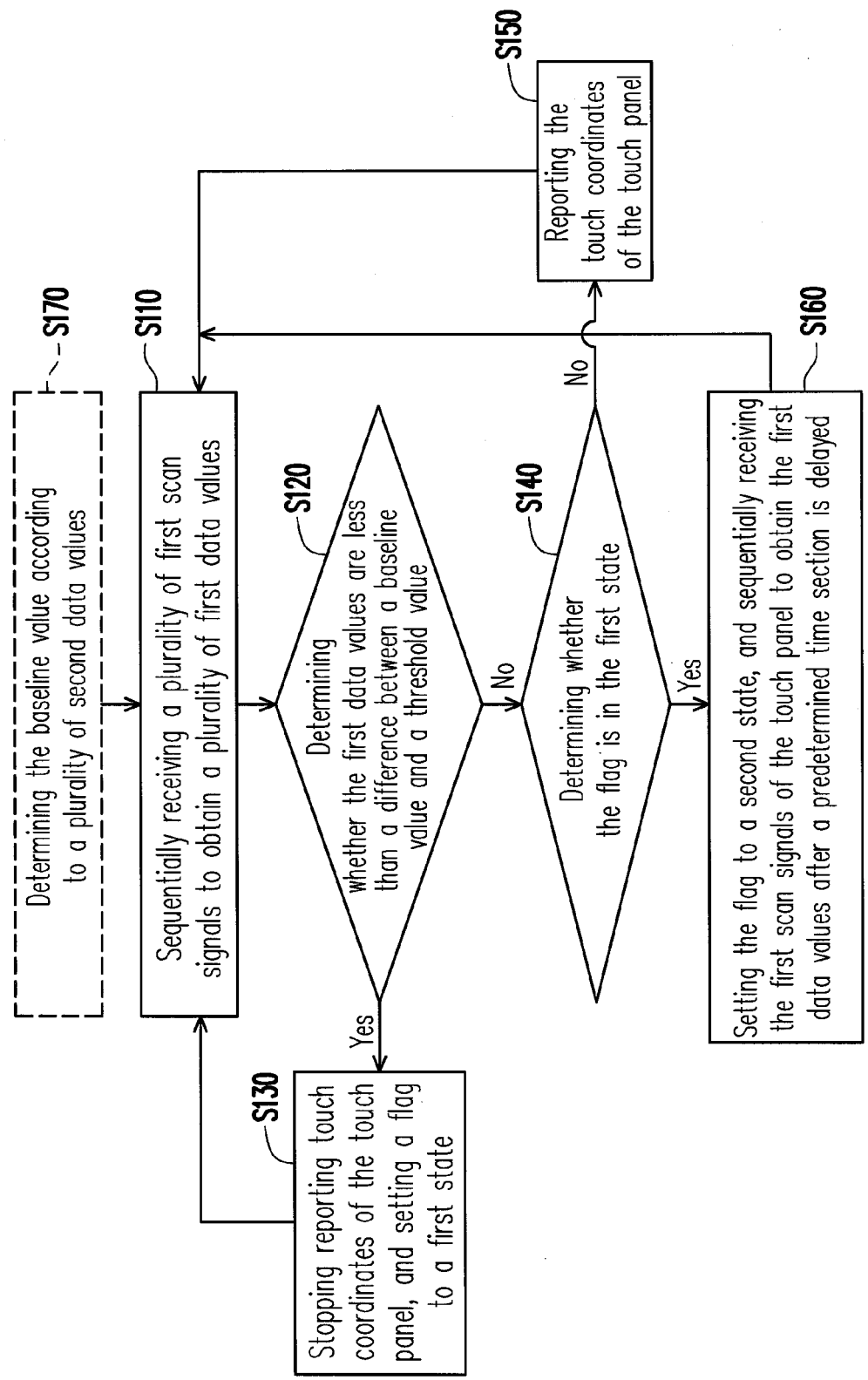
FIG. 3A is a flowchart illustrating a driving method of the touch-sensing device of FIG. 1.

In the present embodiment, to avoid the noise generated when the electronic book device 110 scrolls pages from influencing a touch coordinate determination of the touch controller 124, the touch controller 124 stops reporting the touch coordinates of the touch panel 122 during the time section T1. FIG. 3A is a flowchart illustrating a driving method of the touch-sensing device of FIG. 1. Referring to FIG. 1 to FIG. 3A, the touch controller 124 sequentially receives the scan signals $S_{X1}$-$S_{X8}$ and $S_{Y1}$-$S_{Y8}$ to obtain a plurality of data value (step S110), where a number of the data values corresponds to a number of the scan signals $S_{X1}$-$S_{X8}$ and $S_{Y1}$-$S_{Y8}$, which is, for example, 16, though only the data values d1-d3 are schematically illustrated in FIG. 2. Then, the touch controller 124 determines whether the data values are less than the difference (BL-TH) between the baseline value BL and the threshold value TH (step S120). When one of the data values (for example, the data values d1-d3) is less than the difference (BL-TH) between the baseline value BL and the threshold value TH, the touch controller 124 determines that the electronic book device 110 enters the page scrolling mode, and stops reporting the touch coordinates of the touch panel 120 from a time point t1 (step S130). Moreover, in the step S130, the touch controller 124 sets a flag to a first state, where the first state is, for example, 1. In this way, wrong operation caused by the noise interference can be avoided.

On the other hand, when one of the data values (for example, a data value d1') is greater than or equal to the difference (BL-TH) between the baseline value BL and the threshold value TH, the touch controller 124 determines whether the flag is in the first state (step S140). When the flag is not in the first state, it represents that the electronic book device 110 does not enter the page scrolling mode at a previous moment, and the touch controller 124 reports the touch coordinates of the touch panel 122 to the system end 130 (step S150).

When one of the data values is greater than or equal to the difference (BL-TH) between the baseline value BL and the threshold value TH, and the flag is in the first state, it represents that the electronic book device 110 has left the page scrolling mode, i.e. the data values are recovered back to be close to the baseline value BL (for example, a time point t2). Now, the touch controller 124 sets the flag to a second state (for example, 0), and sequentially receives the scan signals $S_{X1}$-$S_{X8}$ and $S_{Y1}$-$S_{Y8}$ of the touch panel 122 at a time point t3 after a predetermined time section T2 (shown in FIG. 2) is delayed, so as to obtain the data values corresponding to the scan signals $S_{X1}$-$S_{X8}$ and $S_{Y1}$-$S_{Y8}$ at a next moment (step S160). In the present embodiment, by executing the step S160 after the predetermined time section T2 is delayed from the time point t2, wrong operation caused by unstable data values obtained after the page scrolling mode is just ended can be avoided.

Figure 3B:
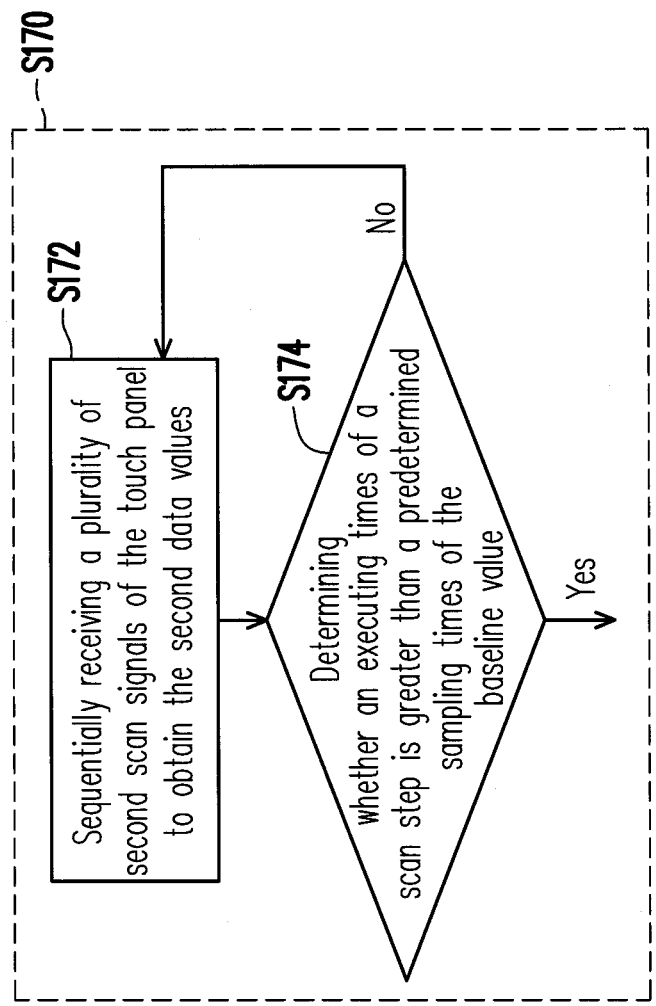
FIG. 3B is a detailed flowchart of a step S170 of FIG. 3A.

Moreover, in the present embodiment, before the step S110 is executed, the baseline value BL may be determined according to a plurality of the data values (step S170). FIG. 3B is a detailed flowchart of the step S170 of FIG. 3A. Referring to FIG. 3A and FIG. 3B, for example, when the touch-sensing display device 100 is booted, the touch controller 124 executes a scan step to sequentially receive the scan signals $S_{X1}$-$S_{X8}$ and $S_{Y1}$-$S_{Y8}$ of the touch panel 122 to obtain a plurality of data values corresponding to the scan signals $S_{X1}$-$S_{X8}$ and $S_{Y1}$-$S_{Y8}$ (step S172). Then, the touch controller 124 determines whether an executing times of the scan step is greater than a predetermined sampling times of the baseline value (step S174). When the executing times of the scan step is smaller than or equal to the predetermined sampling times, the touch controller 124 continually executes the scan step until the executing times of the scan step is greater than the predetermined sampling times. Now, the touch controller 124 can determine the baseline value according to the obtained data values. Then, the step S110 of FIG. 3A is executed, by which the touch controller 124 sequentially receives the scan signals $S_{X1}$-$S_{X8}$ and $S_{Y1}$-$S_{Y8}$ of the touch panel 122 at a next moment, so as to obtain a plurality of data value corresponding to the moment, where the data values are, for example, instant capacitance values or instant voltage values of the scan lines X1-X8 and Y1-Y8. In other words, in the step S170, a main function of the touch controller 124 is to obtain the baseline value used for comparing with the data values, where the baseline value is, for example, the environment capacitance during booting.

Therefore, in the embodiment, the noise is automatically detected, and the touch controller 124 stops reporting the touch coordinates of the touch panel 122 when the data values are less than the difference (BL-TH) between the baseline value BL and the threshold value TH, so as to avoid wrong operation of the touch controller 124 due to the noise interference generated when the electronic book device 110 scrolls pages. Therefore, compared to the conventional technique, the anti-noise effect of the embodiment is achieved without adding a synchronization signal.

In summary, in the embodiment of the invention, the data values and the difference between the baseline value and the threshold value are compared to detect the noise by using an algorithm, and the touch controller can stop reporting the touch coordinates of the touch panel during a noise generation period of the display device, so that wrong operation of the touch-sensing device can be avoided without using the synchronization signal, so as to save the hardware cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A driving method, adapted to a touch-sensing display device, the touch-sensing display device comprising a display device and a touch panel, and the driving method comprising:
   sequentially receiving a plurality of first scan signals of the touch panel to obtain a plurality of first data values; and
   determining whether the first data values are less than a difference between a baseline value and a threshold value, wherein when one of the first data values is less than the difference between the baseline value and the threshold value which represents that the touch panel enters into a noise generation period, reporting of touch coordinates of the touch panel is stopped and the first scan signals of the touch panel are sequentially received again after a predetermined time section is delayed.

2. The driving method as claimed in claim 1, further comprising determining the baseline value according to a plurality of second data values.

3. The driving method as claimed in claim 2, further comprising executing a scan step to sequentially receive a plurality of second scan signals of the touch panel to obtain the second data values.

4. The driving method as claimed in claim 3, further comprising determining whether an executing times of the scan step is greater than a predetermined sampling times of the baseline value, wherein when the executing times of the scan step is smaller than or equal to the predetermined sampling times, the scan step is continually executed.

5. The driving method as claimed in claim 4, wherein when the executing times of the scan step is greater than the predetermined sampling times, the first scan signals of the touch panel are sequentially received to obtain the first data values.

6. The driving method as claimed in claim 1, further comprising setting a flag to a first state when one of the first data values is less than the difference between the baseline value and the threshold value.

7. The driving method as claimed in claim 6, further comprising determining whether the flag is in the first state when one of the first data values is greater than or equal to the difference between the baseline value and the threshold value.

8. The driving method as claimed in claim 7, wherein when the flag is not in the first state, the touch coordinates of the touch panel are reported.

9. The driving method as claimed in claim 7, wherein when the flag is in the first state, the flag is set to a second state, and the first scan signals of the touch panel are sequentially received after the predetermined time section is delayed so as to obtain the first data values.

10. The driving method as claimed in claim 1, wherein the first data values are respectively a capacitance sensing value.

11. The driving method as claimed in claim 1, wherein the display device is an electronic book device.

12. A touch-sensing device, adapted to a touch-sensing display device, the touch-sensing device comprising:
a touch panel, comprising a plurality of first scan lines to output a plurality of first scan signals; and
a touch controller, receiving the first scan signals to obtain a plurality of first data value, and determining whether the first data values are less than a difference between a baseline value and a threshold value, wherein when one of the first data values is less than the difference between the baseline value and the threshold value which represents that the touch-sensing device enters into a noise generation period, the touch controller stops reporting touch coordinates of the touch panel and sequentially receives the first scan signals of the touch panel again after a predetermined time section is delayed.

13. The touch-sensing device as claimed in claim 12, wherein the touch controller determines the baseline value according to a plurality of second data values.

14. The touch-sensing device as claimed in claim 13, wherein the touch controller executes a scan step to sequentially receive a plurality of second scan signals of the touch panel to obtain the second data values.

15. The touch-sensing device as claimed in claim 14, wherein the touch controller determines whether an executing times of the scan step is greater than a predetermined sampling times of the baseline value, wherein when the executing times of the scan step is smaller than or equal to the predetermined sampling times, the touch controller continually executes the scan step.

16. The touch-sensing device as claimed in claim 15, wherein when the executing times of the scan step is greater than the predetermined sampling times, the touch controller sequentially receives the first scan signals of the touch panel to obtain the first data values.

17. The touch-sensing device as claimed in claim 12, wherein when one of the first data values is less than the difference between the baseline value and the threshold value, the touch controller sets a flag to a first state.

18. The touch-sensing device as claimed in claim 17, wherein when one of the first data values is greater than or equal to the difference between the baseline value and the threshold value, the touch controller determines whether the flag is in the first state.

19. The touch-sensing device as claimed in claim 18, wherein when the flag is not in the first state, the touch controller reports the touch coordinates of the touch panel.

20. The touch-sensing device as claimed in claim 18, wherein when the flag is in the first state, the touch controller sets the flag to a second state, and sequentially receives the first scan signals of the touch panel to obtain the first data values after the predetermined time section is delayed.

21. The touch-sensing device as claimed in claim 12, wherein the first data values are respectively a capacitance sensing value.

22. The touch-sensing device as claimed in claim 12, wherein the touch-sensing display device is a touch-sensing electronic book device.

* * * * *